US012055236B2

United States Patent
Kaindlbauer

(10) Patent No.: US 12,055,236 B2
(45) Date of Patent: Aug. 6, 2024

(54) SWITCHING MEANS OF WORKING FLUID

(71) Applicant: BBG Baugeräte GmbH, Kapfenberg (AT)

(72) Inventor: Stefan Kaindlbauer, Strallegg (AT)

(73) Assignee: BBG Baugeräte GmbH, Kapfenberg (AT)

( * ) Notice: Subject to any disclaimer, the term of this patent is extended or adjusted under 35 U.S.C. 154(b) by 32 days.

(21) Appl. No.: 18/004,089

(22) PCT Filed: Jun. 24, 2021

(86) PCT No.: PCT/AT2021/060221
§ 371 (c)(1),
(2) Date: Jan. 3, 2023

(87) PCT Pub. No.: WO2022/000008
PCT Pub. Date: Jan. 6, 2022

(65) Prior Publication Data
US 2023/0265939 A1 Aug. 24, 2023

(30) Foreign Application Priority Data

Jul. 1, 2020 (AT) .............................. A 50556/2020

(51) Int. Cl.
*F16K 11/07* (2006.01)
*F16K 31/122* (2006.01)

(52) U.S. Cl.
CPC ........ *F16K 31/122* (2013.01); *F16K 11/0716* (2013.01)

(58) Field of Classification Search
CPC . F16K 11/0716; B25D 9/20; B25D 2209/007; F15B 2013/041; F15B 13/0402; Y10T 137/86702
See application file for complete search history.

(56) References Cited

U.S. PATENT DOCUMENTS 9,488,196 B2 11/2016 Storm et al.
2011/0309281 A1* 12/2011 Hoppe ................ F16K 11/0716
251/324

(Continued)

FOREIGN PATENT DOCUMENTS

DE 1229804 B 12/1966
KR 950019030 A 7/1995
WO 2013037356 A1 3/2013

*Primary Examiner* — Kelsey E Cary
(74) *Attorney, Agent, or Firm* — Laurence A. Greenberg; Werner H. Stemer; Ralph E. Locher

(57) ABSTRACT

In the case of an incorrect polarity of connectors in hydraulic networks, a switching device is provided, and formed with a connector part, a valve body, a switching part displaced axially in the valve body within limits, a base part and a top part. Wherein cooperating annular chambers for the conducting of a working fluid are formed in the region of an inner surface of the valve body and an outer surface of the switching part. Annular surfaces ($A2, A3, A5, A7$) are acted upon with pressurized fluid on the switching part towards the top part and annular surfaces ($A1, A4, A6$) of the switching part are acted upon towards the base part have a following size relations when there is a permanent fluidic connection of the annular chambers:

$A2=A3>0.5\times A1;$ $A4>A5+A7;$ $A3+A7>A4+A6;$ $A1=2A2-A4+A5-A6+A7.$

7 Claims, 2 Drawing Sheets

(56) References Cited

U.S. PATENT DOCUMENTS

| | | | | |
|---|---|---|---|---|
| 2012/0000550 A1* | 1/2012 | Hunnicutt | ........... | F15B 13/0402 |
| | | | | 137/487.5 |
| 2016/0319812 A1* | 11/2016 | Krech | ....................... | F04B 7/02 |
| 2017/0130621 A1* | 5/2017 | Suganuma | .............. | F01L 1/053 |
| 2020/0408115 A1* | 12/2020 | Mitsutani | .............. | F01L 1/3442 |

* cited by examiner

SWITCHING MEANS OF WORKING FLUID

FIELD AND BACKGROUND OF THE INVENTION

The invention relates to a switching means for the polarity of the feed and return of a working fluid for consumers, irrespective of a supply polarity.

Hydraulic consumers, such as hydraulic striking mechanisms, for example, will have, where necessary, high-pressure connections for working fluid and connections for returning said working fluid using the same connection means, such as identical threaded parts and the like. When installing or, in particular, when exchanging hydraulic striking mechanisms for repair or for service purposes during practical application, the connections for the feed and return of working fluid can be disadvantageously mixed up.

Striking mechanisms and consumers of this kind usually have a maximum permissible return flow pressure or maximum pressure in the region of the discharge of the working medium of 8 bar, meaning that in the event that the connections are made wrongly and high pressure is applied to this return region, there can be malfunctions in the working method or damage to a consumer.

SUMMARY OF THE INVENTION

The problem addressed by the present invention is that of eliminating these disadvantages and creating a switching means which ensures an intended connection polarity of a consumer, irrespective of the polarity of the connections.

This problem is solved according to the invention by a switching means, substantially formed using a connection part on a valve body with one or multiple connections in each case for a feed and a discharge of the working medium with a tubular switching part that can be displaced axially in the valve body within limits, having radial bores in two axially spaced planes with a base part and a top part, each forming the displacement limits for the switching means, wherein cooperating annular spaces for the respective conducting of working fluid are formed in the region of the inner surface of the valve body and the outer surface of the switching means, and the annular surfaces that can be acted upon with fluid on the switching means towards the top part and the annular surfaces that can be acted upon towards the base part have certain size relations, with the proviso that there is a permanent fluidic connection from an annular space connected to a connection pole and an annular space with an annular surface of the valve body that can be acted upon towards the top part.

A one-sided limitation according to the invention of the size relations of the annular surfaces that can be acted upon with high-pressure fluid towards the top part and towards the base part has the advantage that as the disparity between the values increases, the intensity of a hydraulic circuit of a required feed polarity for a consumer is increased. In other words, by selecting the size relations of the axial annular surfaces of the switch part, a so-called switching impulse can be set when a necessary feed polarity for a consumer is created.

BRIEF DESCRIPTION OF THE FIGURES

A structural design of a switching means according to the invention can be found in the patent claims and the basic drawings according to FIG. 1 and FIG. 2.

DETAILED DESCRIPTION OF THE INVENTION

Figure 1:
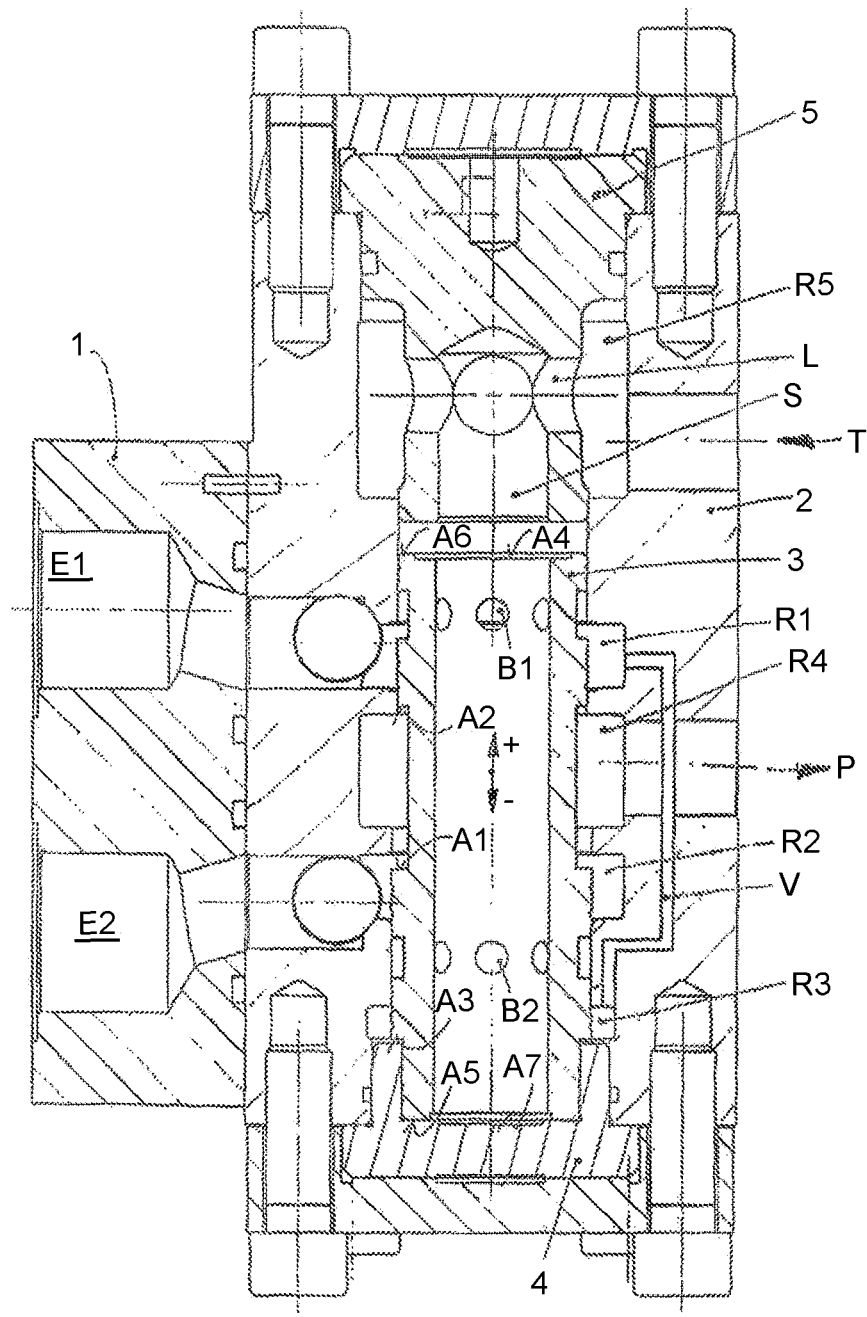

The following list of reference signs is intended to provide a better overview of the functional parts of the switching means.

THEY REPRESENT 1 connection part
E1, E2 connections
P high-pressure feed to the consumer
T discharge of working fluid from the consumer
2 valve bodies
3 switching part
4 base part
top part
R1 annular space connected to E1
R2 annular space connected to E2
R3 annular space connected to R1$^\wedge$
R4 annular space connected to P
R5 annular space connected to T
V permanent fluid connection
A ring surfaces on the switching part 3, can be subjected to high-pressure
   fluid in the direction of the parts
A1 direction part 4
A2 direction part 5
A3 direction part 5
A4+A6 ring surfaces direction part 4
A5+A7 ring surfaces direction part 5
B1 hole in 3 to R1
B2 hole in 3 to R2
S axial blind hole in 5
L introductory hole in perforated wall S of 5

The graphic representations show in principle variants with different supply polarity of a switching means according to the invention arranged in front of a consumer.

If high-pressure fluid is present in the connection part 1 at the connection E2 of the connection part 1 (FIG. 1), then when a switching part 3 is positioned on the base part 4 there is a connection to the annular space R2. This annular space 2 has a coaxial passage to the annular space R4, and therefore to the high-pressure inlet of a consumer, between the switching part 3 and valve body 2.

A discharge T of working fluid from the consumer is connected to an annular space R5 in the valve body 2. A top part 5 with an axial blind hole S and introductory hole L protrudes through the hole wall into the annular space R5, which cavities form a guide for the hydraulic fluid into a tubular switching part 3. The switching part 3 positioned on the base part 4 has radial bores B1 and B2 in two axially spaced planes, of which only the bore B1 has a connection to the annular space R1 and further to the connection E1 for returning the working fluid at low pressure.

Figure 2:
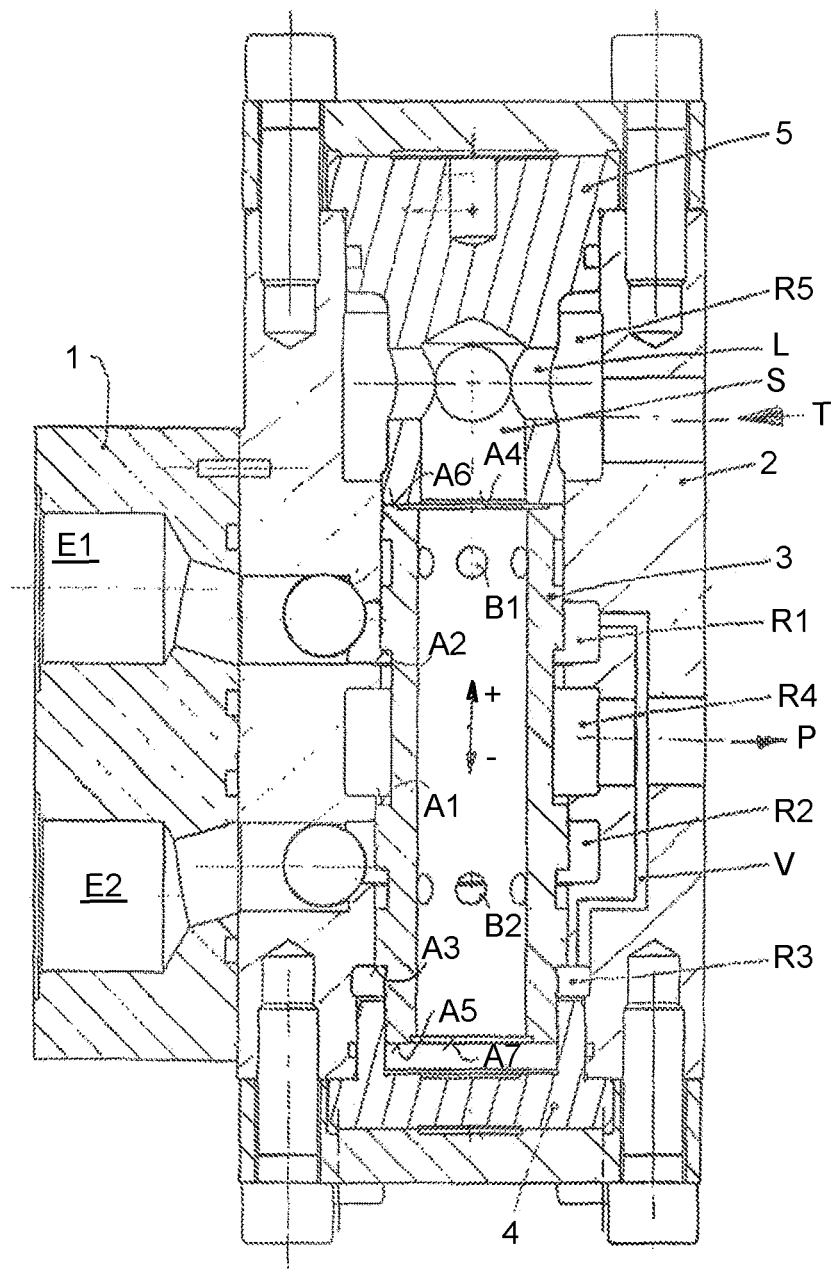

There now follows (FIG. 2) an introduction of high-pressure fluid at connection E1. Hence, when the switching part 3 strikes the top part 5, the high-pressure fluid is conducted into the annular space R1 and from there through a coaxial passage to the annular space R4 and consequently given to the high-pressure feed P of a consumer.

Working fluid with low pressure in a discharge T from the consumer can be guided into an annular space R5 and further through introductory holes L into an axial blind hole S of a top part 5 and consequently into a tubular switching part 3. In a switching part 3 adjacent to the top part 5, the holes B2 produce a connection in the annular space R2 and, consequently, a connection of this kind about connection E2 for a return of the working fluid from the consumer.

A positioning of the switching part 3 on the base part 4 is due to the annular surfaces A1 minus the annular surface A2 being subjected to high-pressure fluid P, taking into account the annular surfaces (A4+A6) minus the annular surfaces (A3+A5+A7) with low pressure from the discharge fluid.

A positioning of the switching part 3 on the top part is due to the annular surfaces (A2+A3) minus the annular surface A1 being subjected to high-pressure fluid P, taking into account the annular surfaces (A5+A7) minus the annular surfaces (A6+A4) with low pressure from the discharge fluid.

The invention claimed is:

1. A switching means for a polarity of a feed and a return of a working medium or working fluid for consumers, irrespective of a different supply polarity, the switching means comprising:
   a connection part;
   a valve body with at least one connection in each case for the feed and a discharge of the working medium, said valve body having an inner surface;
   a tubular switching part being displaced axially in said valve body within limits, and having radial bores formed therein in two axially spaced planes, said tubular switching part having an outer surface;
   a base part;
   a top part, said base part and said top part each forming displacement limits for said tubular switching part;
   cooperating annular spaces for conducting the working fluid being formed in a region of said inner surface of said valve body and said outer surface of said switching part; and
   said tubular switching part having annular surfaces A2, A3, A5, A7 being acted upon with pressure fluid towards said top part and annular surfaces A1, A4, A6 being acted upon towards said base part which have a following size relations when there is a permanent fluidic connection of said cooperating annular spaces:

$$A2=A3>0.5\times A1 \qquad \text{I.}$$

$$A4>A5+A7 \qquad \text{II.}$$

$$A3+A7>A4+A6 \qquad \text{III.}$$

$$A1=2A2-A4+A5-A6+A7 \qquad \text{IV.}$$

2. The switching means according to claim 1, wherein said tubular switching part being movable in said valve body is positioned irrespective of the supply polarity due to the size relations of said annular surfaces A1 to A7 subjected to a high-pressure fluid on said base part or on said top part, and brings about a conducting of the working fluid in said tubular switching part in such a manner that it ensures an identical polarity of the feed and the discharge in each case for the consumers.

3. The switching means according to claim 1, wherein in said valve body the feed of the working fluid for the consumers is connected to one of the cooperating annular spaces, said one cooperating annular space is positioned in an axial direction between said cooperating annular spaces of possible supply poles and a respective position of said tubular switching part ensures a fluidic connection of the high-pressure or current feed pole to the feed and the discharge to a return pole.

4. The switching means according to claim 1, wherein one of said cooperating annular spaces connected to the feed being a feed pole has the permanent fluidic connection in said valve body to another of said cooperating annular spaces between said valve body and said tubular switching part, said tubular switching part is formed with an annular surface of said annular surfaces that can be acted upon towards said top part.

5. The switching means according to claim 1, wherein an annular space of said cooperating annular spaces connected to a supply pole has an annular surface of said annular surfaces of said tubular switching part that can be acted upon towards said base part and positions said tubular switching part on said base part.

6. The switching means according to claim 1, wherein:
   said top part has a hole wall and an axial blind hole and radial introductory holes formed therein; and
   one of said cooperating annular spaces is formed in said valve body for the discharge of the working fluid from the consumer, in said one cooperating annular space said top part with said axial blind hole and said radial introductory holes protrudes into said hole wall, wherein a front side of said hole wall represents a displacement limit of said tubular switching part and said tubular switching part ensures a fluidic connection to another of said cooperating annular spaces, and therefore in a current return pole, in end positions by means of activated said radial bores.

7. The switching means according to claim 1, wherein said cooperating annular spaces have the following size relations:

$$A1=1$$

$$A2=A3=2/3 A1$$

$$A4=1.63\times A1$$

$$A5=A6=1/4 A1$$

$$A7=1.30\times A1.$$

* * * * *